Feb. 25, 1969 J. T. GEJOFF 3,429,603
MEANS FOR ASSEMBLING TOGETHER A TWO-PART HOUSING
Filed April 21, 1967 Sheet 1 of 4

Fig.3-A

INVENTOR:
JAMES T. GEJOFF
BY
ATTORNEYS

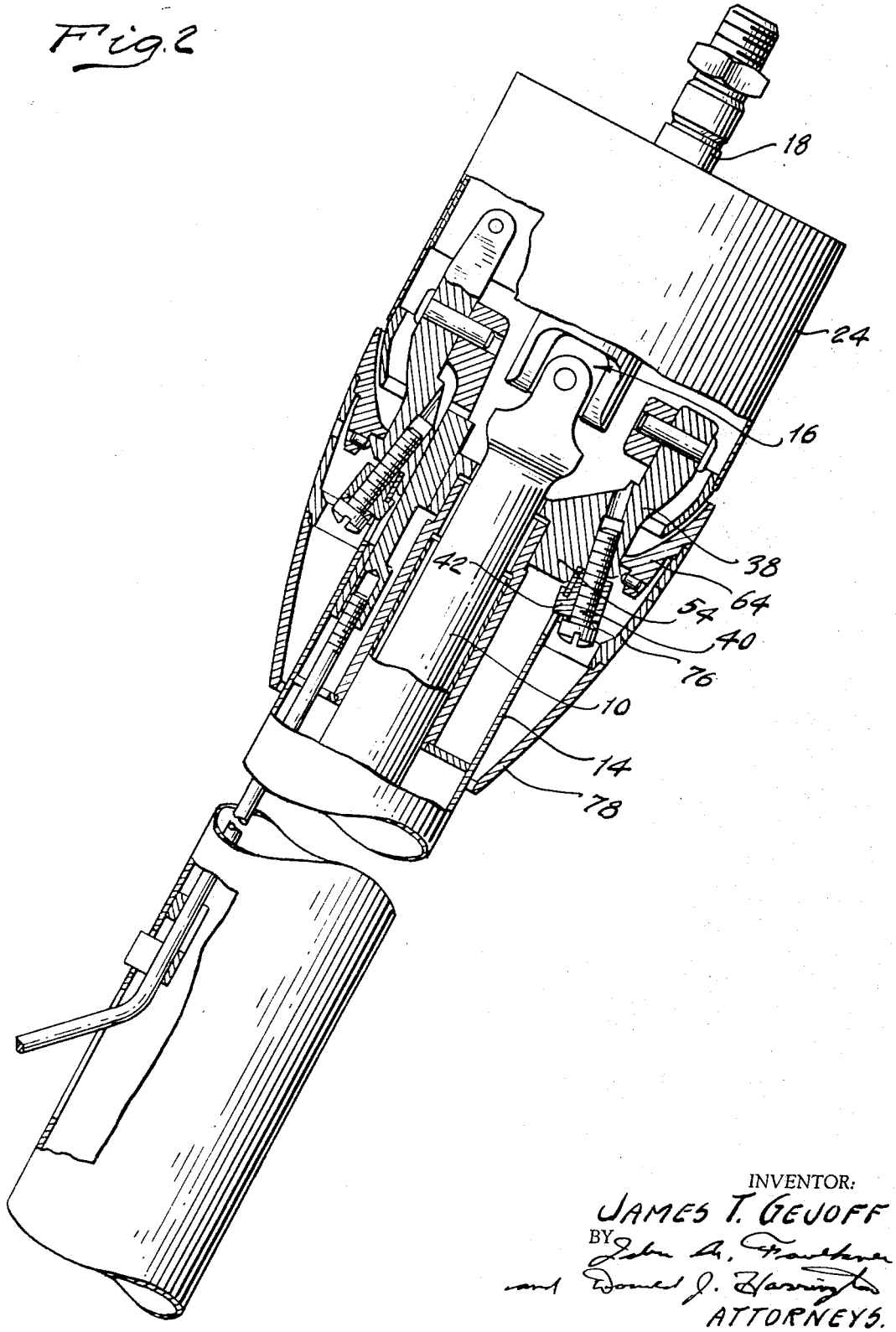

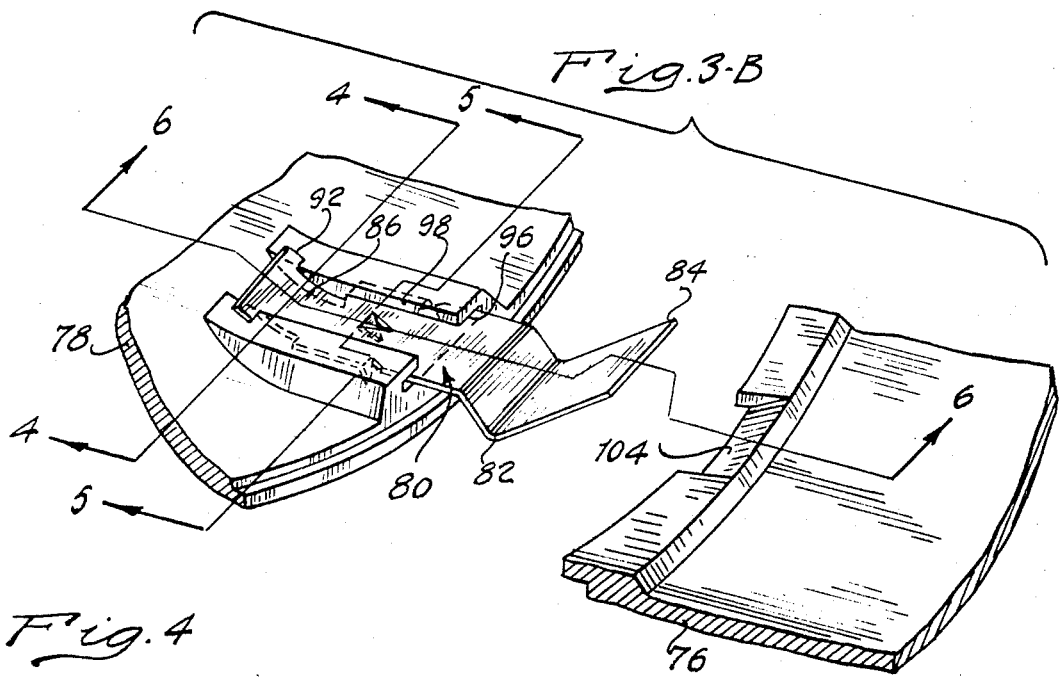
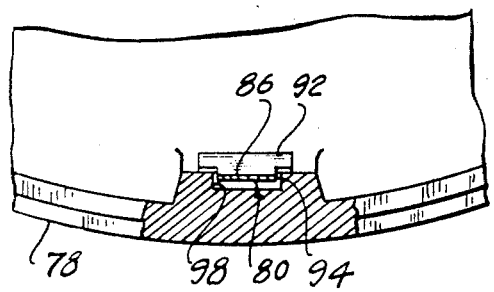
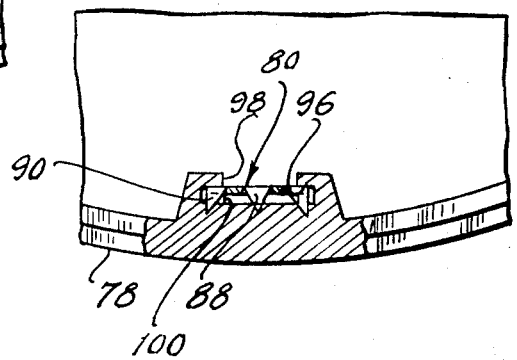
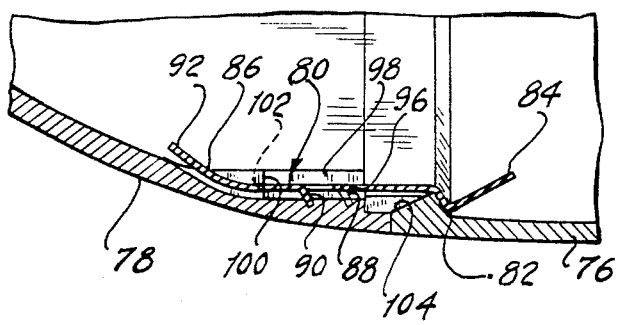

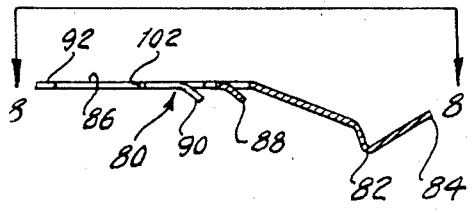
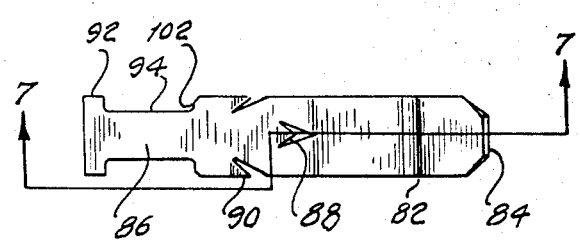
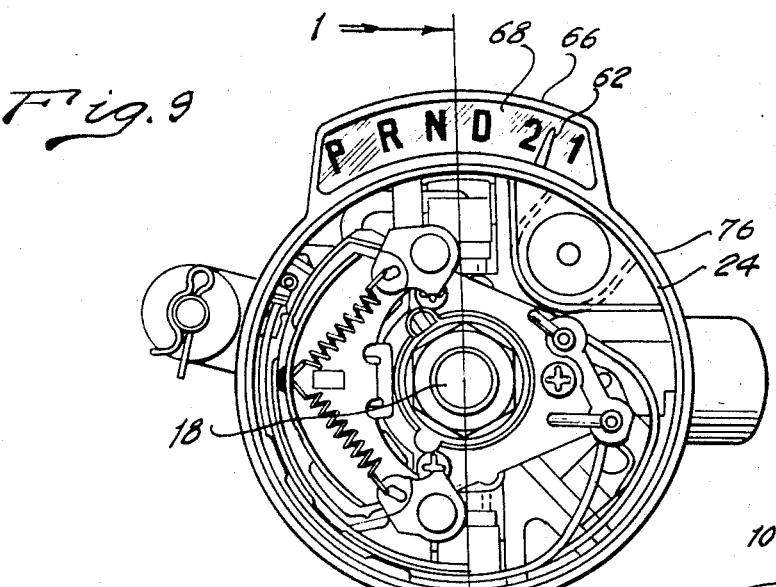
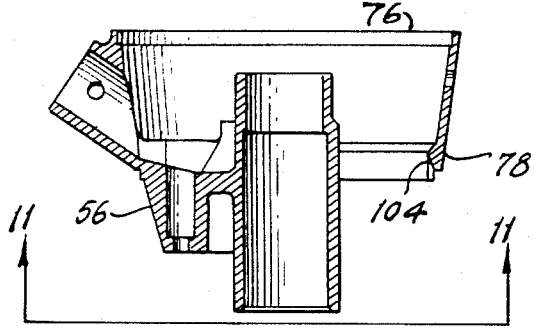
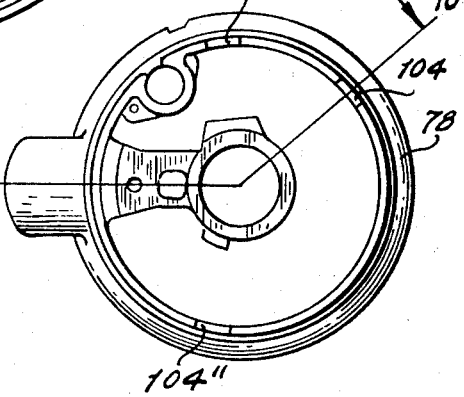
INVENTOR:
JAMES T. GEJOFF

United States Patent Office 3,429,603
Patented Feb. 25, 1969

---

3,429,603
MEANS FOR ASSEMBLING TOGETHER A TWO-PART HOUSING
James T. Gejoff, Dearborn Heights, Mich., assignor to Ford Motor Company, Dearborn, Mich., a corporation of Delaware
Filed Apr. 21, 1967, Ser. No. 632,648
U.S. Cl. 292—80                        6 Claims
Int. Cl. E05c 19/06

ABSTRACT OF THE DISCLOSURE

This specification describes a two-part housing for a steering column gearshift assembly in an automotive vehicle. Interlock retainer elements, which permit quick assembly and disassembly of the housing parts, are locked to one of the parts by means of a tongue-and-groove connection that is adapted especially for volume production assembly techniques.

---

*Brief summary of the invention*

My invention relates generally to improvements in retainers for assembling together multiple part housing assemblies, and more particularly to a self-locking, self-locating retainer for use with housing assemblies such as those found in transmission selector control assemblies mounted on the steering columns of automotive vehicles.

It is current design practice to construct automotive steering column assemblies to accommodate a gearshift selector mechanism in the driver's compartment adjacent the driver-operated steering wheel. A steering shaft, which extends through the column, is operatively connected by means of a steering linkage system to the dirigible wheels.

The transmission selector mechanism may include a shift tube that concentrically surrounds the steering shaft. It is connected at its upper end adjacent the steering wheel to a transmission selector lever which is controlled by the vehicle operator as he selects the various drive ranges. A transmission drive range indicator dial, which also is mounted on the head of the column assembly, is designed to indicate the various angular positions of this particular tube as it is adjusted by the operator. This entire assembly is enclosed by a suitable housing, portions of which rotate with the steering shaft as other portions thereof are held stationary by the steering column assembly.

The housing normally is formed in two parts by means of a die casting operation. Provision must be made in the die castings to accommodate retainer bolts for securing together the multiple parts of the die casting. During assembly the parts must be manually fastened by bolts after a cumbersome aligning operation.

The improved construction of my invention eliminates the need for bolting together the parts of the housing. It eliminates also the need for aligning the parts with respect to each other during assembly.

The permissible manufacturing dimensional tolerances that can be used are of an increased magnitude compared to the tolerances required with known prior art constructions. My invention permits also quick assembly and disassembly of the housing parts without the necessity for using bolts, screws, rivets or other conventional fastening devices.

*Brief description of the views of the drawings*

FIGURE 2 is another longitudinal cross-sectional view of the column assembly of FIGURE 1 taken along a plane that is transverse to the plane of the section of FIGURE 1.

FIGURES 3A and 3B show isometric views of portions of the two-part housing for the structure of FIGURES 1 and 2. FIGURE 3A shows the parts in pre-assembled disposition. The views are seen from the plane of section line 3B—3B of FIGURE 1.

FIGURE 4 is a cross-sectional view taken along the plane of section 4—4 of FIGURE 3B.

FIGURE 5 is a cross-sectional view taken along the plane of section line 5—5 of FIGURE 3B.

FIGURE 6 is a cross-sectional view taken along the plane of section line 6—6 of FIGURE 3B.

FIGURE 7 is a detail sectional view of a spring clip used in the structure of FIGURES 1 and 2. It is taken along section line 7—7 of FIGURE 8.

FIGURE 8 is a plan view of the clip in FIGURE 7 as seen from the plane of section line 8—8 of FIGURE 7.

FIGURE 9 is a view of the upper portion of the column assembly as seen from the plane of section line 9—9 of FIGURE 1.

FIGURE 10 is a sectional view of the housing as seen from the plane of section line 10—10 of FIGURE 11.

FIGURE 11 is a plan view of the structure of FIGURE 10 as seen from the plane of section line 11—11 of FIGURE 10.

*Particular description of the invention*

Figure 1:
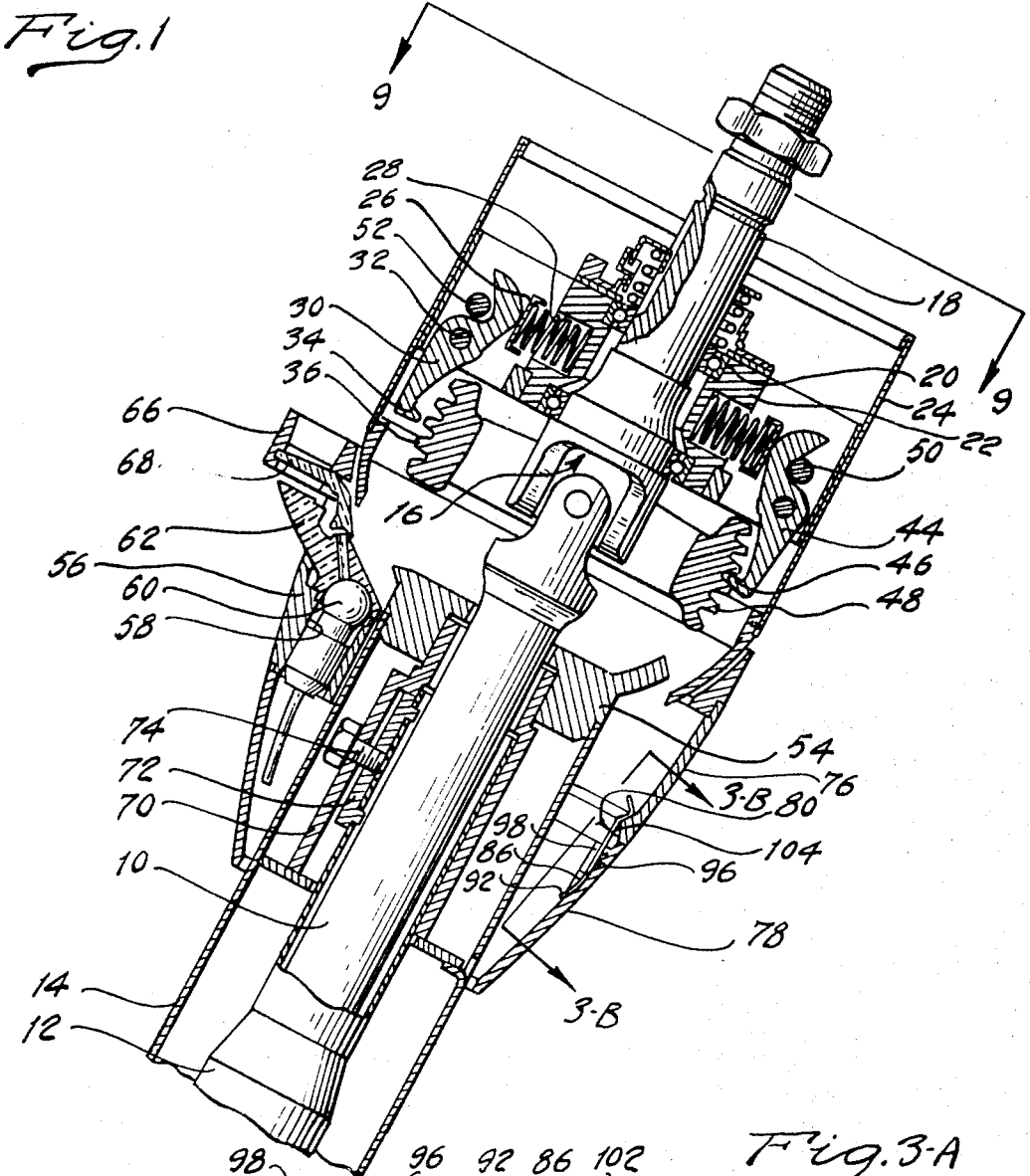
FIGURE 1 shows a longitudinal cross-sectional view of a steering column assembly for an automotive vehicle.
Figure 1:
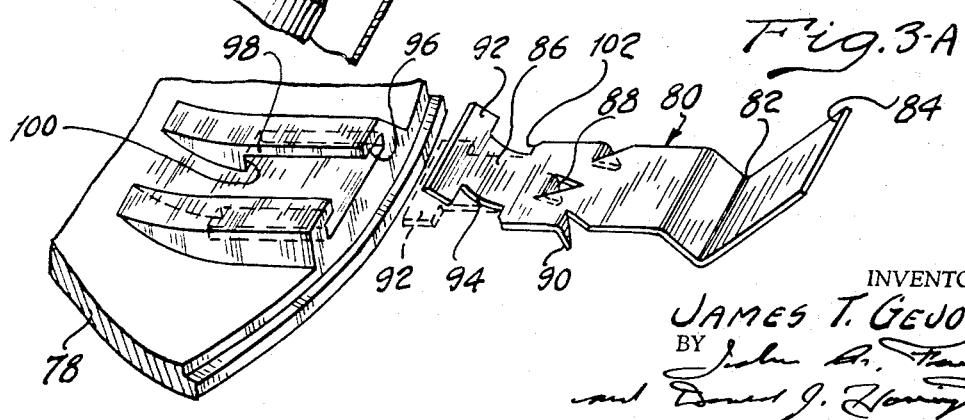

In FIGURE 1 numeral 10 designates a steering shaft which is connected at its left or lower end to a steering gear assembly for an automotive vehicle. Shaft 10 is concentrically situated within a tubular shift control shaft 12. The shafts 10 and 12 are mounted within a stationary steering column which includes a support tube 14 connected to a vehicle chassis and to the vehicle dash structure inside the passenger compartment.

The right or upper end of the shaft 10 is connected by means of a universal joint 16 to a steering shaft 18. The shaft can be splined or keyed to a vehicle steering wheel assembly, not shown. Shaft 18 is journaled by bearing 20 in a bearing support 22. Surrounding support 22 is a cowling 24.

A spring-loaded plunger 26 is received within a radial opening 28 formed in the support 22. A similar opening, located 180° out of position with respect to the opening 28, also is formed in support 22. A locking pawl 30 is pivoted on a pivot end 32 carried by the support 22. Pawl 30 includes a tooth 34 which engages a toothed sector 36. The sector forms a part of a fixed member 38 as indicated in FIGURE 2. This member is bolted by means of bolts 40 to a collar 42 which in turn is secured to the upper end of the tube 14.

A similar locking pawl 44 is pivoted on the support 22. It has a tooth 46 which is engageable with toothed sector 48.

When pawl 44 is positioned as shown, the tooth 46 is engageable with sector 48 thereby locking the support 22 against motion with respect to the shaft 10.

The right-hand ends of the pawls 44 and 30 are urged radially outwardly by their respective springs. A driver-operated lever having portions 50 and 52 engage the right-hand ends of the pawls 44 and 30, respectively. When this lever is actuated by the operator, the portions 50 and 52 will ride against cam surfaces formed on the pawls 44 and 30 thereby causing them to disengage their respective locking teeth. Thus the steering wheel can be tilted with respect to the axis of shaft 10. Either one pawl or the other will cause the steering wheel and the shaft 18 to become locked with respect to the shaft 10 when it is returned to its locking position.

The upper end of the tube 14 carries a transmission selector lever socket 54. Socket 54 includes a lamp retainer portion 56 having an opening 58 within which is mounted an electric lamp 60. Carried on the portion 56 is a plastic light-conducting element 62, one end of which surrounds the filament of the lamp 60.

As seen in FIGURE 2, a fixed ring 64 is secured to the member 38. Carried by the member 64 is an indicator dial 66 as shown in FIGURE 1. The light-conducting element 62 is situated behind the lens 68 of the dial 66. Thus, the indicia on the lens 68, as illustrated for example in FIGURE 9, becomes illuminated along with the light-conducting element 62 itself. When the element 62 becomes aligned with one of the indicia, the transmission will be conditioned for operation in the range indicated by that particular indicia.

The selector tube 12 is secured to the member 54 by means of a bracket 70 which is pinned at its right-hand end to the member 54. An adaptor 72 is located in aligned openings formed in the upper end of tube 12. The adaptor 72 and the bracket 70 are joined together by a set screw 74. Thus when the member 54 is moved by the vehicle operator, the shift tube 12 rotates about its axis. The member 54 includes a peripheral ring 76 which is best indicated by referring to the detail view of FIGURE 10.

The housing of which the periphery 76 forms a part includes also a circular shell 78 having a right-hand periphery that registers with and matches the left-hand margin of the peripheral part 76. The shell 78 and the part 76 are held together by spring steel fastener clips 80. These can best be seen by referring to FIGURES 7 and 8. By preference there are three such clips although a different number also could be employed.

The clip 80 includes a detent part 82 and an inclined cam part 84. It includes also a body 86 having retainer teeth 88 and 90 formed therein. The left-hand end of the body 86 includes a T-element 92. The region between the T-element 92 and the teeth 88 and 90 is formed of a reduced dimension as shown in FIGURE 8 at 94.

The shell 78 is a die-cast part. During the die-casting operation a slot 96 is formed in the inner wall of the shell. An opening 98 also is formed in the shell 78. It is of a width that is less than the width of the slot 96.

The left-hand end of the slot 96 terminates at a shoulder 100 which engages a corresponding shoulder 102 formed on the fastener clip 80.

Following the die-casting operation during which the shell 78 is formed, the fastener clips 80 can be inserted as shown in FIGURE 3A into the slot 96 with the T-element 92 on the outside of the slot 96. The reduced section of 94 of the clip fastener extends through opening 98 as indicated. The fastener can be forced into the slot 96 until it is in the position shown in FIGURE 3B with the shoulders 102 engaging the shoulders 100.

The left margin of the peripheral portion 76 is formed with a cam surface 104 which is adapted to register with the cam portion 84 of the clip 80. When the two housing parts 78 and 76 are brought together as shown in FIGURE 6, the detent portion 82 engages the cam portion 104 and locks the two housing parts together in a secure fashion. The teeth 88 and 90 of the fastener clips frictionally engage the wall of the groove at 96 thereby preventing withdrawal.

During assembly the shell 78 is inserted over the tube 14. Assembly operations then are carried out at the upper end of the steering column assembly. After this is completed, the shell 78 is moved into registry with the margin of the peripheral portion 76 and is held fast in that position by the fastener clips. There is no need for forming threaded openings and bolt supports on the housing.

Neither is there a need for aligning the shell 78 with respect to the other parts of the housing. This greatly simplifies the assembly operation and, because of the reduction in assembly time, manufacturing costs are reduced substantially.

Having thus described one embodiment of my invention, what I claim and desire to secure by U.S. Letters Patent is:

1. In a quick assembly fastening means for assembling together in end-to-end relationship two housing parts, the margin of one part being adapted to register with the margin of the other part when they are assembled to form a unitary housing assembly, a spring clip fastener having a detent portion at one end thereof, the other end thereof having a section of reduced dimension, a groove formed in said one housing part extending inwardly from its margin, an opening formed in said groove and extending from said groove to the interior of said one housing, the peripheral width of said opening being less than the width of said slot, said clip fastener being adapted to be received within said groove with the reduced diameter portion thereof extending through said opening, the detent portion of said clip fastener extending outwardly from said one housing portion when said clip fastener is assembled, said detent portion being adapted to engage the peripheral margin of said other housing portion as the housing portions are brought into registry.

2. The combination as set forth in claim 1 wherein said other housing portion is formed with a shoulder extending along its peripheral margin, said shoulder being engaged by said detent portion when said housing portions are brought into registry.

3. The combination as set forth in claim 1 wherein said clip fastener is formed with at least one locking tooth which engages the wall of said groove when said clip fastener is assembled into said groove.

4. The combination as set forth in claim 1 wherein said groove defines a shoulder located at an inward position, said clip fastener having a shoulder adjacent the reduced dimensional part thereof, said shoulders engaging each other as said clip fastener is inserted into said groove to its assembled position.

5. The combination as set forth in claim 2 wherein said groove defines a shoulder located at an inward position, said clip fastener having a shoulder adjacent the reduced dimensional part thereof, said shoulders engaging each other as said clip fastener is inserted into said groove to its assembled position.

6. The combination as set forth in claim 3 wherein said groove defines a shoulder located at an inward position, said clip fastener having a shoulder adjacent the reduced dimensional part thereof, said shoulders engaging each other as said clip fastener is inserted into said groove to its assembled position.

References Cited

UNITED STATES PATENTS

| 831,803 | 9/1906 | Schindewolf | 292—87 |
| 2,456,934 | 12/1948 | Feiertag | 292—80 X |
| 2,610,763 | 9/1952 | Mendelson | 292—80 X |

FOREIGN PATENTS

| 167,413 | 6/1959 | Sweden. |
| 1,331,403 | 5/1963 | France. |

MARVIN A. CHAMPION, *Primary Examiner.*

JOHN R. MOSES, *Assistant Examiner.*